Figure 6:
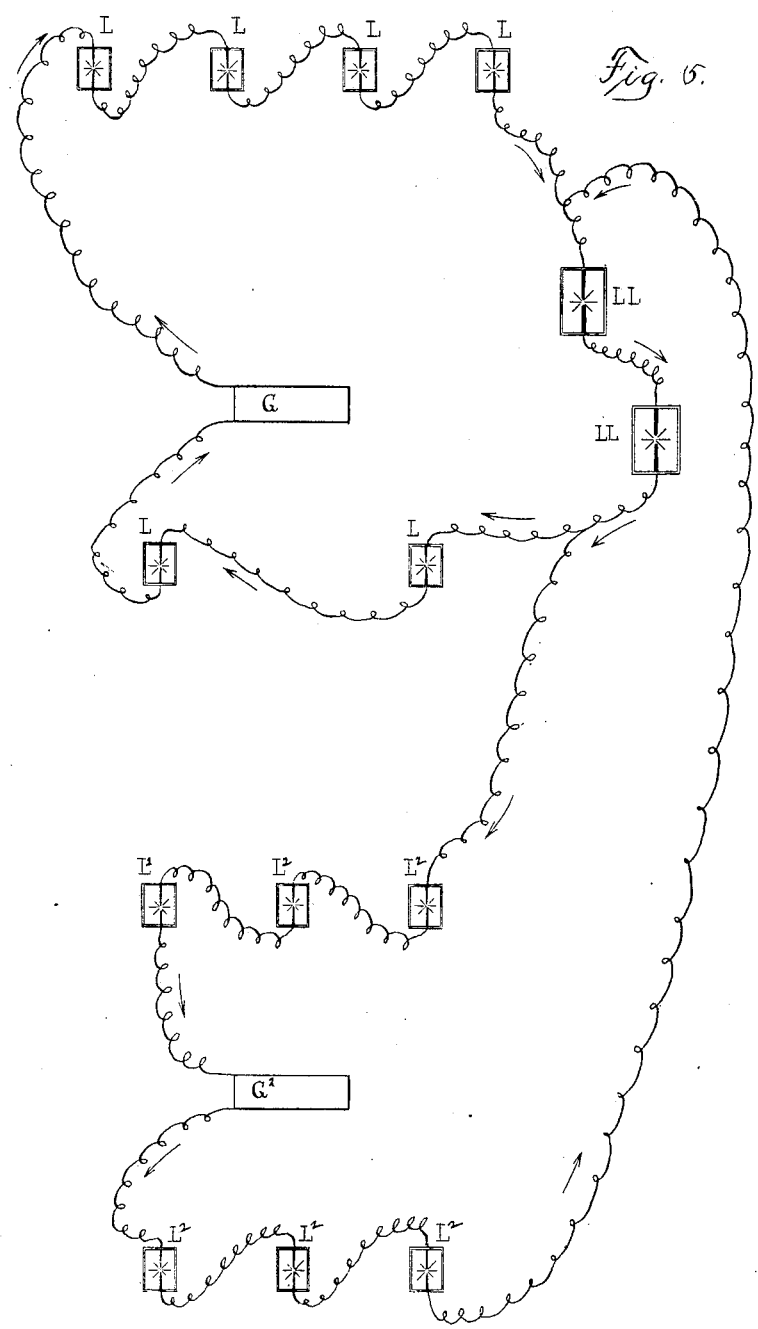

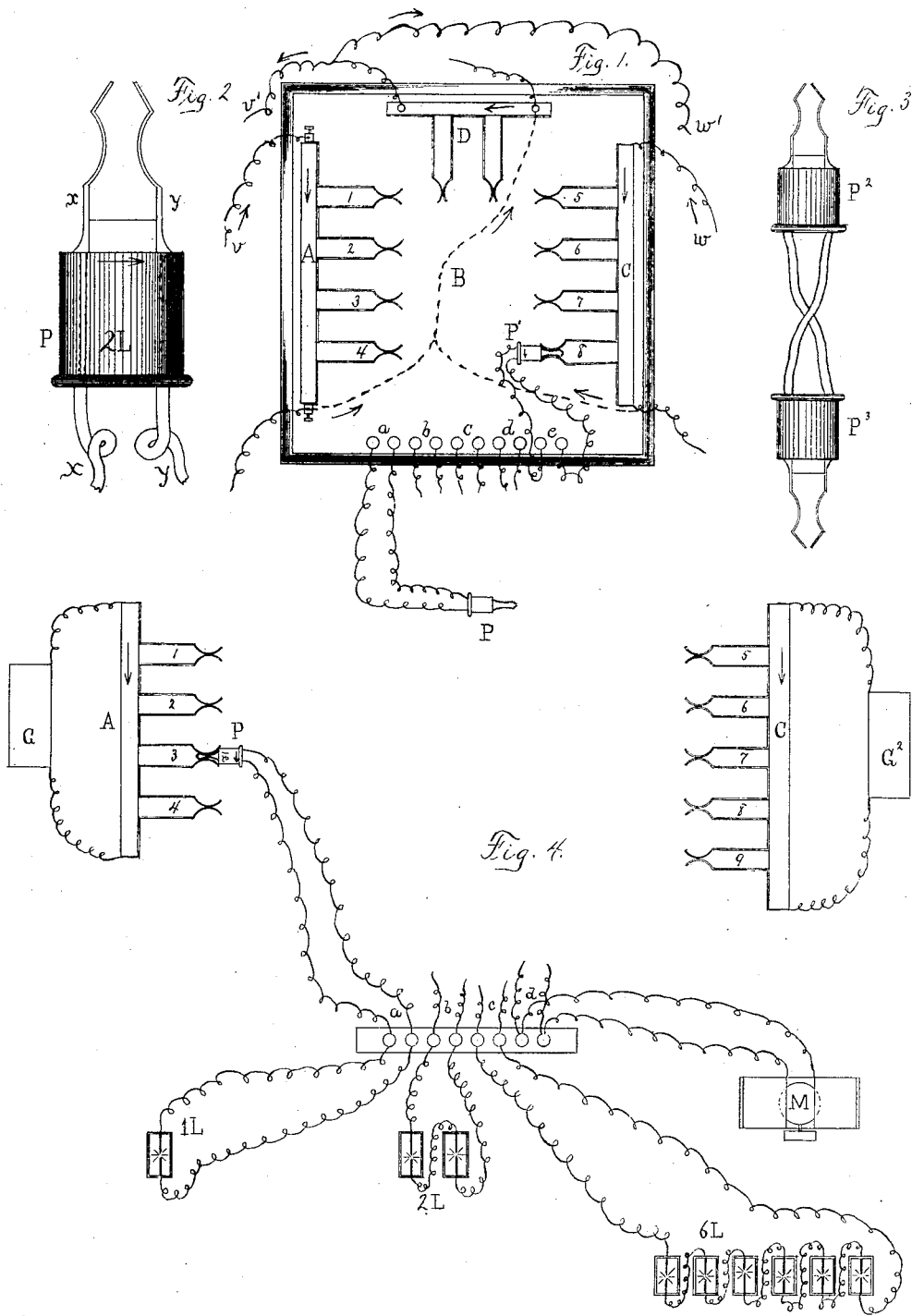

(No Model.)  
E. THOMSON.  
SYSTEM OF ELECTRICAL DISTRIBUTION.

No. 255,824. Patented Apr. 4, 1882.

Witnesses.  
W. B. Thomson  
E. Wilbur Rice.

Inventor.  
Elihu Thomson

UNITED STATES PATENT OFFICE.

ELIHU THOMSON, OF NEW BRITAIN, CONNECTICUT, ASSIGNOR TO THE AMERICAN ELECTRIC COMPANY, OF SAME PLACE.

SYSTEM OF ELECTRICAL DISTRIBUTION.

SPECIFICATION forming part of Letters Patent No. 255,824, dated April 4, 1882.

Application filed June 8, 1881. (No model.)

*To all whom it may concern:*

Be it known that I, ELIHU THOMSON, a citizen of the United States, and resident of New Britain, county of Hartford, State of Connecticut, have invented an Improved System of Electrical Distribution, of which the following is a specification.

My invention relates to the employment of one or more generators of electricity for furnishing electrical current to operate two or more electric lamps, motors, &c.; and it consists in improved methods of connecting said lamps and motors to the generators, interchanging one generator for another, combining and interchanging a number of operative circuits, so as to be fed by one, two, or more generators; to control the above variations of circuits from a point near the generators or other central point; in general, to so adapt the use of electrical currents for lighting and motive power in the various portions of a large building or of a city that the flow of current through any section may be under control, as before specified, from a central switch-board or its equivalent.

To carry out the objects of my invention I combine with each generator a number of connecting switches, points, or springs, arranged consecutively or in series in a closed circuit for the generator, and bring both terminals of all the light or power circuits into suitable proximity with the generator-circuit, suitable means being provided for interposing each light or power circuit in the generator-circuit by connecting both terminals thereof to said latter circuit at any one of its points, whereby, when two or more light or power circuits are connected simultaneously to the generator-circuit, they will be connected in series, and by properly combining the light or power circuits the desired working resistance will be given to the generator.

As the preferred method of carrying out my invention, I propose to complete the circuit of the generator through a number of pairs of springs, arranged in series, each pair being adapted to be forced apart by switch-plugs, consisting of two plates insulated from one another, to each pair of which are connected the terminals of one of the light and power circuits. When two or more generators are employed I bring the series of circuit-closing springs of all the generators into suitable proximity to one another, so that any light or power circuit, or any combination of them, may be interposed in any generator-circuit, while, moreover, by the aid of pairs of switch-plugs constructed as before mentioned and joined by two insulated conductors I may place any two generators in circuit with one another for tension, so that the electro-motive force of any two or more may be combined. Each switch-plug and any pair of circuit closing springs together constitute what is known in telegraphy as a "spring-jack," which allows one circuit to be readily interposed in another without interrupting the flow of current in the latter; but my invention is not limited to this particular construction of the electric switch, and other forms may be employed, it only being necessary to provide a switch or circuit changing apparatus at several points in the same continuous localized generator-circuit, and to bring both terminals of the operative or working circuits into suitable proximity therewith, so that by any proper devices well known in the electrical art connected to each operative circuit any two or more of said circuits may be connected simultaneously in series into a generator-circuit.

Figure 1 is a front view of a switch-board in which the main features of my invention are shown. Fig. 2 is a view of the plug or circuit-terminals. Fig. 3 is a view of a double plug for putting any two generators in series; Fig. 4, the parts shown in Fig. 1 separate and connected to operative circuits; Fig. 5, a combined circuit for operating lights of different intensities from two or more generators used together.

In Fig. 1 a board, B, bears strips A C D, serving as the means of attachment of circuit-closing springs 1 2 3 4 5 6 7 8, &c., sprung together at their outer ends, and through which springs the circuit of an electric generator is closed. Pairs of connections $a\ b\ c\ d\ e$ constitute terminals of operative circuits leading to the switch-board, each pair being provided with a plug, P, to be inserted between the opposed faces of any two springs, as P' inserted at 8, strip C. By the insertion of said plug the current from the generator is forced to pass through the resistance in the circuit of which the plug P' bears the terminals. By similarly inserting plugs into the springs 5 6 7 two or more independent outside working circuits may be interposed in series in the same generator-circuit, and thus the desired working resistance may be given to the generator. In like manner the springs attached to A have plugs inserted when it is desired to use the generator feeding them.

The plugs are constructed, as in Fig. 2, in a well-known manner, of an insulating body with metal strips and wires $x \, y$, bent to be easily inserted or removed from between the opposed springs, and their insertion or removal is effected without breaking the circuit. This is accomplished by the form of the extremities of the pieces $x \, y$, being bent toward one another, as shown, while the extremities of the opposed springs 1 2 3 4, &c., Fig. 1, are bent outward, as shown, so that when the plug is being inserted between any pair of opposed springs both pieces $x \, y$ are in contact with a spring, respectively, before said spring-surfaces are wedged apart by the insertion of the plug. The opposite action is followed on the removal of a plug.

It is preferable to mark upon the plug P, Fig. 2, characters to show the proper position it should occupy when inserted between the springs, so that the direction of the current is proper. This is easily effected by an arrow or similar symbol upon the plug and a corresponding mark upon the pieces A C, Fig. 1. When the plug is inserted so that the arrows have a like direction the current flows normally in its proper direction through each circuit. It is also desirable to have marked upon the plug the number of lights, location, or resistance of the circuit to which it is attached.

Fig. 3 shows a double plug used for coupling any two generators in series by the insertion of one of the pair of plugs into the springs, as 1 A, Fig. 1, of one generator, and the other plug into those of another generator, as 5 C, for example. The said double plug consists of two plugs similar to Fig. 1, whose conducting-wires are joined each to each. The conductors from each plug are heavily insulated to prevent contact between them where they cross.

Fig. 4 gives a general plan of the connections when two generators, G and $G^2$, are used. The wires from the generators run to the terminal springs of each series, A and C, and the current passes from one spring to that adjoining by the curved surface in contact.

If it be desired to work circuit $a$ (marked 1 L) as one lamp-circuit, its appropriate plug, P, is inserted, as at 3, between the spring-surfaces. The circuit $b$ (marked 2 L) may be operated by a similar plug attached to it and inserted in a precisely similar way into the circuit of either generator G or $G^2$, as may be desired. Other circuits, as $c$ 6 L and $d$ M, may be provided and placed in circuit with the generators when desired.

M represents an electric motor, to be thrown into or out of circuit in a similar manner. The plugs for circuits $b \, c \, d$ are omitted for clearness.

The working capacities of the generators G $G^2$ may be widely different; but the arrangement I have described enables the operator to give to each its own working resistance of circuit by the insertion of a number and character of circuits by the plugs P to give the resistance desired. Let us suppose the capacity of the generator G be three lights in series, and that of the generator $G^2$ be six lights in series, and that the circuits $a$ 1 L and $b$ 2 L are to be used continuously while $c$ 6 L is only used for short intervals. Then the circuits $a$ 1 L and $b$ 2 L would be placed in connection with generator G and $c$ 6 L with generator $G^2$.

Should it be desired to run three of the six lights of circuit $c$ 6 L, the remaining lights being switched out in the usual way at the lamps, while the circuits $a$ 1 L and $b$ 2 L are also run, the whole of the three circuits are then connected by the insertion of their plugs with generator $G^2$.

Where the capacity of each generator is variable, as when an automatic current-regulator is used with the generator, the capabilities of my invention are greatly enhanced. The interchangeability of circuits is then easily possible, provided no one generator is given such resistance of circuit that exceeds its greatest working circuit-resistance.

In the use of large and intense currents it is essential that the switches and distributers be of such form and disposition as to avoid destructive effects to insulation, &c., following derangements of circuits, and my invention is particularly designed to make the use of such currents safe and easy.

Any of the operative circuits leaving the switch may be put in circuit by the insertion of its appropriate plug, as before described, and the resistance of said circuit may be that of a motor, arc lamp or lamps, incandescent lamps arranged in series or in multiple arc, or electrolytic bath, but is more particularly applicable to electric lighting.

Fig. 5, Sheet 2, shows a plan of connections of the two generators G $G^2$ when used to operate lights of different intensities together. Let the current of the generator G be ten webers and that of $G^2$ be eight webers, and let the electro-motive force of each generator be sufficient to sustain eight arcs in series. Then the lights L L L L L L will be operated by the current of G, or ten webers, and the lights $L^2 \, L^2 \, L^2 \, L^2 \, L^2 \, L^2$ by that of $G^2$, or eight webers; but the lights L L L L, being in a portion of circuit common to both generators, will have, as in the figure, the sum of the currents, or eighteen webers, to operate them. This has the effect of making the lights L L L L about twice as brilliant as any of the other lights; but where the connections are such that the current of one generator is changed so as to flow oppositely to the direction as indicated by the arrows in Fig. 5, small current strengths will flow through L L L L, depending on their resistances, and the lights L L L L will be supplanted by those of small lighting capacity. Thus, by the use of two or more generators, or of two or more currents taken from the same generator, lights of various intensities are operated successfully in the same system.

The connections to D, Fig. 1, show the manner of combining the circuits, as in Fig. 5, the springs at D being provided for the introduction of plugs leading to lamp-circuits corresponding to those of L L L L, Fig. 5, and thus different intensities of lights may be obtained in the same generating system. The connections to D, Fig. 1, as shown, are merely combinations of the positive and negative terminals from each generator. The current then flows as indicated by the arrows, the positive terminals from each generator being represented by $v$ and $w$, respectively, and the return or negative connections at $v'$ $w'$, as shown.

I claim—

1. In an electric light and power system, the combination, with an electric generator, local circuit, and two or more pairs of circuit-closing springs, such as described, arranged in series in said circuit, of a number of working light or power circuits, the two terminals of each of which are kept insulated from one another and formed into a plug for insertion between any pair of springs, whereby the working circuits may be included in series and in any desired combination in the same generator-circuit.

2. In an electric light and power system, the combination, with an electric generator, of two or more switch-points or circuit-closers arranged in series, a number of light or power circuits, the two terminals of each of which are brought into suitable proximity with the generator-circuit, and means, as described, whereby the light or power circuit may be interposed in series and in any desired combination or relation in the same generator-circuit.

3. In an electric lighting and distributing system, the combination of two or more electric generators, two or more pairs of springs for each generator, through the opposed surfaces of which the circuit of a generator is closed in series, a series of lighting or distributing circuits, and a set of plugs forming the terminals of said circuits, whereby said circuits may be inserted as a part of or removed from the circuits of said generators in any desired combination or may be changed from one generator to another.

4. A switch plug or plugs, P, provided with a symbol for indicating the direction of the current when inserted between the switching-surfaces, in combination with the switch-board or spring having corresponding symbol.

5. The combination, substantially as described, of two or more generators, a pair of circuit-closing springs in each generator-circuit, and two switch-plugs, constructed as described, and joined by two insulated conductors.

6. In an electric lighting and distributing system, the combination of two or more electric generators, each provided with a circuit containing a lamp or lamps operated by said generators independently, with a partial circuit common to the generators, and containing lamps or equivalent resistances in which the energy given out as useful work is due to the combined current strengths of the said generators or the differences thereof, according to the respective directions of their individual currents.

7. The combination of two or more electric circuits, each containing one or more electric lamps, with a partial single circuit common to both, and in which partial-circuit lamps of greater or less lighting power than those used upon the other parts of the circuits are placed and operated, substantially as described.

ELIHU THOMSON.

Witnesses:
W. B. THOMSON,
E. WILBUR RICE.